US008483027B1

(12) United States Patent
Mak et al.

(10) Patent No.: US 8,483,027 B1
(45) Date of Patent: Jul. 9, 2013

(54) DISK DRIVE QUALIFYING HEAD/DISK INTERFACE USING JITTER SEEK EXCITATION

(75) Inventors: Chee Wai Mak, Lamlukka (TH); Chee Wai Lau, Klongluang (TH); Suttisak Nilchim, Takuapa (TH); Burin Jindasuay, Maharaj (TH); Pramook Toworachot, Huay Kwang (TH)

(73) Assignee: Western Digital Technologies, Inc., Irvine, CA (US)

( * ) Notice: Subject to any disclaimer, the term of this patent is extended or adjusted under 35 U.S.C. 154(b) by 232 days.

(21) Appl. No.: 13/115,866

(22) Filed: May 25, 2011

(51) Int. Cl.
*G11B 11/00* (2006.01)

(52) U.S. Cl.
USPC ..................... 369/53.31; 369/53.37

(58) Field of Classification Search
None
See application file for complete search history.

(56) References Cited

U.S. PATENT DOCUMENTS

| 5,615,335 | A | 3/1997 | Onffroy et al. |
| 5,812,752 | A | 9/1998 | Yamada |
| 6,061,805 | A | 5/2000 | Suzuki et al. |
| 6,078,453 | A | 6/2000 | Dziallo et al. |
| 6,084,733 | A | 7/2000 | Ohzeki et al. |
| 6,510,752 | B1 | 1/2003 | Sacks et al. |
| 6,831,796 | B2 | 12/2004 | Tan et al. |
| 6,861,854 | B1 | 3/2005 | Guo et al. |
| 7,106,552 | B2 | 9/2006 | Hirano et al. |
| 7,209,305 | B2 | 4/2007 | Chan et al. |
| 7,423,837 | B2 | 9/2008 | Hutsell |
| 7,490,259 | B2 | 2/2009 | Saitoh |
| 2005/0216782 | A1 | 9/2005 | Saitoh |

*Primary Examiner* — Paul Huber

(57) ABSTRACT

A disk drive is disclosed comprising a disk including a plurality of tracks, a head coupled to an actuator arm actuated over the disk, and control circuitry operable to first seek the head from a first track to a second track, read data from the second track to generate a first read signal, second seek the head from the second track to a third track, read data from the third track to generate a second read signal, third seek the head from the third track to a fourth track, and read data from the fourth track to generate a third read signal. The first, second, and third read signals are evaluated to qualify the disk drive, wherein the first, second, and third seeks are executed in proximity so as to excite the actuator arm with a jitter motion.

24 Claims, 5 Drawing Sheets

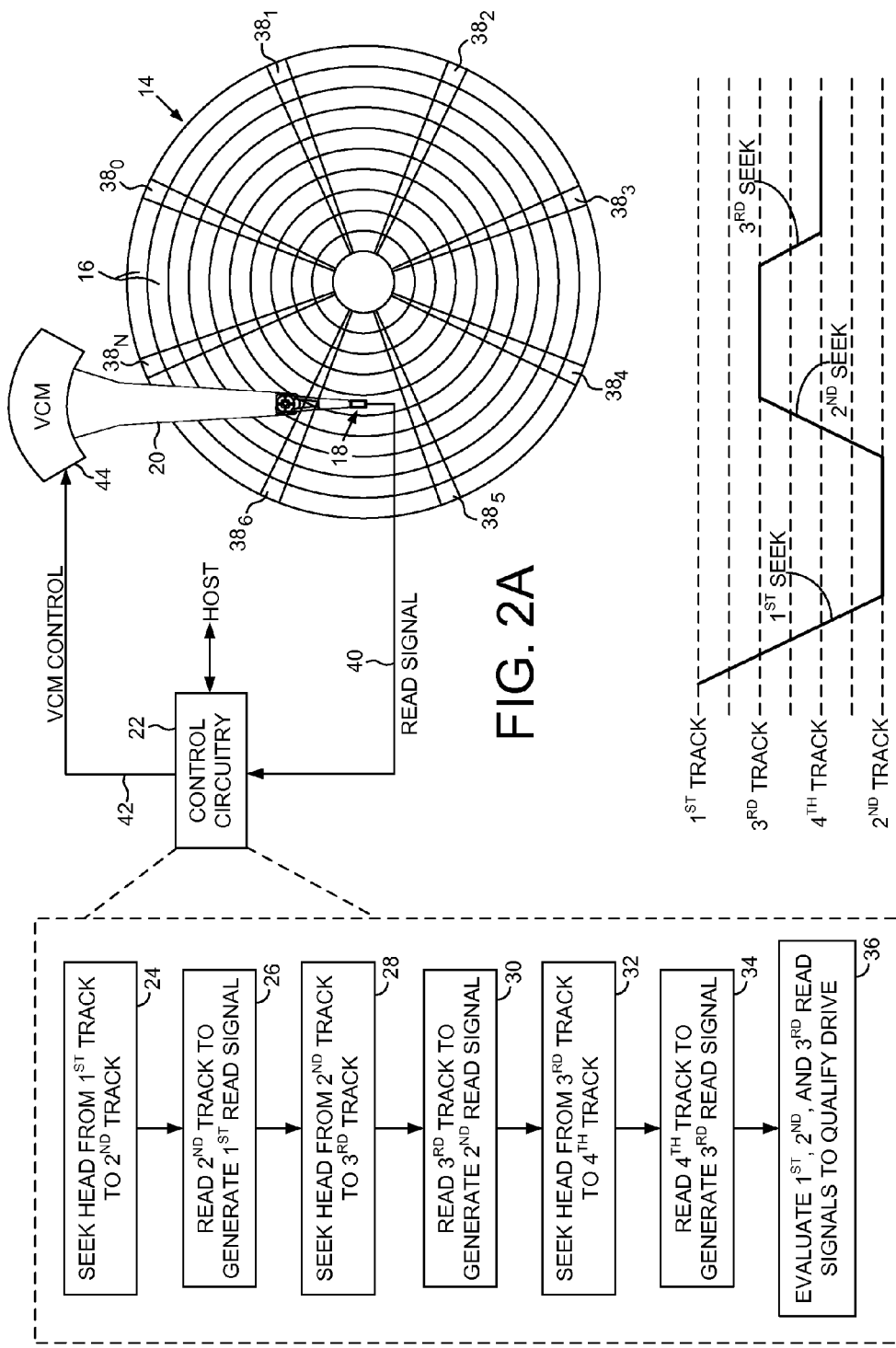

DISK DRIVE QUALIFYING HEAD/DISK INTERFACE USING JITTER SEEK EXCITATION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 1 as comprising a number of servo tracks 3 defined by servo sectors $5_O$-$5_N$ recorded around the circumference of each servo track.

Each servo sector $5_i$ comprises a preamble 7 for storing a periodic pattern, which allows proper gain adjustment and timing synchronization of the read signal, and a sync mark 9 for storing a special pattern used to symbol synchronize to a servo data field 11. The servo data field 11 stores coarse head positioning information, such as a servo track address, used to position the head over a target data track during a seek operation. Each servo sector $5_i$ further comprises groups of servo bursts 13, which are recorded with precise intervals and offsets relative to the track centerlines. The servo bursts 13 provide fine head position information used for centerline tracking while accessing a data track during write/read operations.

BRIEF DESCRIPTION OF THE DRAWINGS

FIG. 2A shows a disk drive according to an embodiment of the present invention comprising a disk and a head coupled to an actuator arm actuated over the disk.

FIG. 2B is a flow diagram according to an embodiment of the present invention wherein the control circuitry performs a plurality of jitter seek operations in order to excite the actuator arm with a jitter motion, and then evaluates the resulting read signals to qualify the disk drive.

FIG. 2C illustrates an example embodiment wherein each seek distance is progressively shorter such that the jitter motion comprises a decaying oscillation.

DETAILED DESCRIPTION OF EMBODIMENTS OF THE INVENTION

Figure 1:
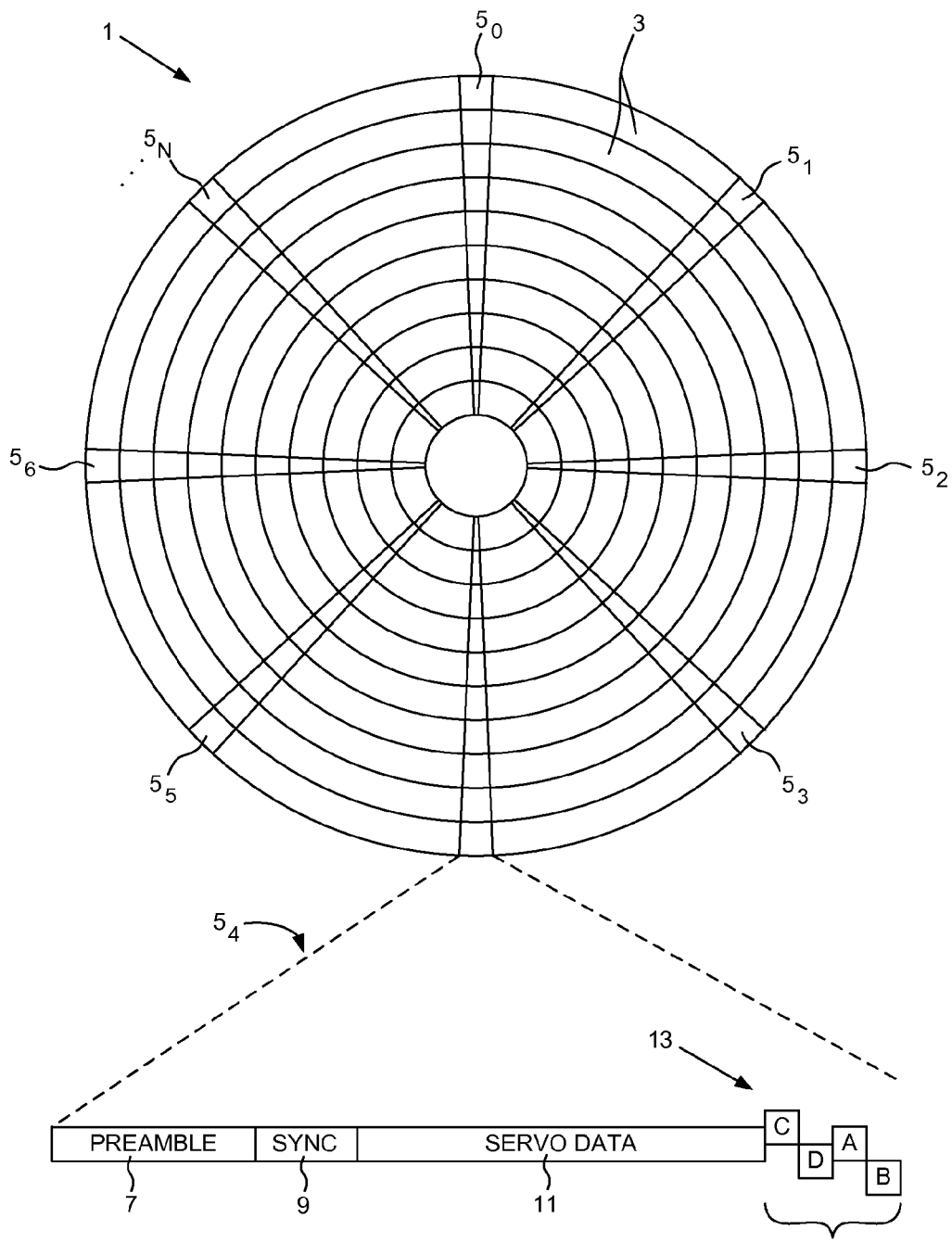
FIG. 1 shows a prior art disk format comprising a plurality of tracks defined by embedded servo sectors.

FIG. 2A shows a disk drive according to an embodiment of the present invention comprising a disk 14 including a plurality of tracks 16, and a head 18 coupled to an actuator arm 20 actuated over the disk 14. The disk drive further comprises control circuitry 22 operable to execute the flow diagram of FIG. 2B (with an example illustrated in FIG. 2C), wherein the control circuitry first seeks the head a first seek distance from a first track to a second track (step 24), reads data from the second track for a first time interval to generate a first read signal (step 26), second seeks the head a second seek distance from the second track to a third track (step 28), wherein the second seek distance is less than the first seek distance, reads data from the third track for a second time interval to generate a second read signal (step 30), third seeks the head a third seek distance from the third track to a fourth track (step 32), wherein the third seek distance is less than the second seek distance, reads data from the fourth track for a third time interval to generate a third read signal (step 34), and evaluates the first, second, and third read signals to qualify the disk drive (step 36), wherein the first, second, and third seeks are executed in proximity so as to excite the actuator arm with a jitter motion.

The disk 14 shown in the embodiment of FIG. 2A comprises a plurality of servo sectors $38_0$-$38_N$ that define a plurality of servo tracks, wherein data tracks 16 are defined relative to the servo tracks. The control circuitry 22 processes a read signal 40 emanating from the head 18 to demodulate the servo sectors $38_0$-$38_N$ into a position error signal (PES) representing a position error of the head relative to a target data track. The control circuitry 22 comprises a servo compensator for filtering the PES to generate a control signal 42 applied to a voice coil motor (VCM) 44 that rotates the actuator arm 20 about a pivot in order to actuate the head 18 radially over the disk 14 in a direction that reduces the PES. In one embodiment, the disk drive may also comprise a microactuator (e.g. a piezoelectric actuator) for actuating the head in fine radial movements over the disk. The microactuator may be integrated with the actuator arm at any suitable location, such as at a suspension/arm coupling, or a head gimbal coupling.

As the disk is rotated an air bearing forms between the disk and the head such that the head flies above the disk surface (in very close proximity). Design defects or manufacturing defects in any aspect of the VCM servo system, such as the seek trajectories, VCM servo compensator algorithm, VCM driver, VCM electromagnetic parameters, actuator arm, suspension, suspension/arm coupling, head/gimbal coupling, dynamic fly height control, etc., may cause errors in the disk drive, such as damage to the head due to contacting the disk surface (head slap), or high fly writes leading to unrecoverable data during read operations. In the embodiments of the present invention, the control circuitry performs a number of seek operations in order to excite the actuator arm with a jitter motion, thereby stressing the VCM servo system so that defects are more readily detected and resolved through redesign, reworking, water falling to lower performance, depopulating heads, etc.

In the embodiment of FIG. 2C, each progressive seek is shorter than the previous seek such that the jitter motion comprises a decaying oscillation or "ringing" which may increase the stress on the servo system and further enhance defects. The embodiment of FIG. 2C shows three seek operations but any suitable number of seek operations may be employed.

Figure 3A:
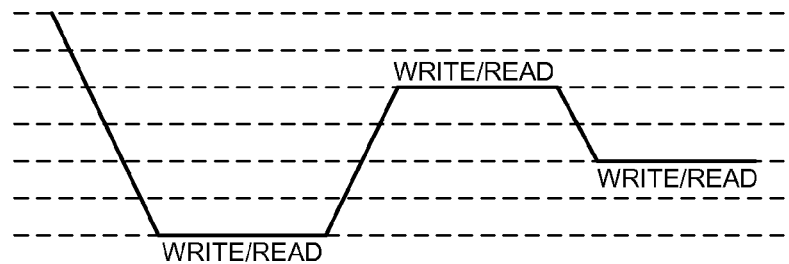
FIG. 3A illustrates an embodiment of the present invention wherein data is written and/or read after each jitter seek operation.

FIG. 3A illustrates an embodiment of the present invention wherein while the head is positioned over a target track, the head performs a write and/or a read operation. In one embodiment, the control circuitry writes a test pattern to the target track and then reads the test pattern from the target track. Alternatively, the control circuitry may read the data prerecorded in the target track, and then write/read the prerecorded data so that data prerecorded in the target track is not lost.

The control circuitry may evaluate any suitable aspect of the read signal in order to qualify the disk drive, such as the amplitude of the read signal, or quality metrics generated within a read channel (gain errors, timing errors, sequence detector metrics, etc.). In one embodiment, the control circuitry may measure an error rate of the read signal in order to qualify the disk drive. The error rate may be generated in any suitable manner, such as by comparing the written data to the read data to measure bit error rate, or by using an error detection code to measure symbol error rate.

The sequence of writing and reading data from each track may be carried out in any suitable order. Referring again to FIG. 3A, in one embodiment after executing each seek the data may be written and then read (written during a first revolution and then read during a second revolution) prior to performing the next seek. In another embodiment, after executing the first seek the data may be written to the track, and then immediately perform the next seek and write data to the next track and so on. After writing the tracks, the data may be read using the same sequence (seek/read, seek/read, etc.). This embodiment evaluates the performance of the disk drive for both writes and reads since the jitter seeks is used for both writes and reads.

In yet another embodiment, the data may be written to the target tracks using the jitter seeks, and then read back using non-jitter seeks. For example, the data may be written in the jitter seek sequence of seek/write, seek/write, etc. in the pattern shown in FIG. 3A. The data may then be read using a much lower frequency of seeks (non-jitter seeks), such as seek, wait N revolutions, read, wait N revolutions, seek, wait N revolutions, read, wait N revolutions, etc.. This embodiment evaluates the affect that jitter seeks has on the write operation. Alternatively, the data may be written using low frequency seeks (non-jitter seeks) and then read using jitter seeks in order to evaluate the affect that jitter seeks has on read operations.

Figure 3B:
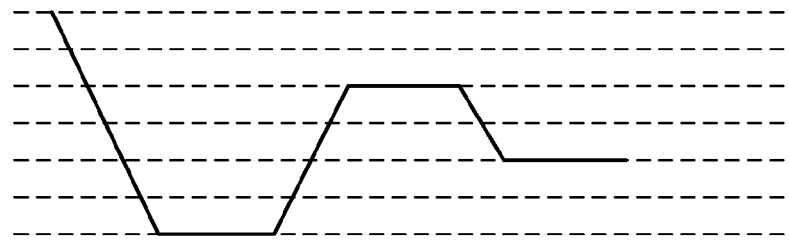
FIG. 3B illustrates an embodiment of the present invention wherein the time intervals that the head remains on each track are configured in order to select the frequency of the jitter seeks.

Any suitable oscillation frequency may be selected for the jitter seeks, and in one embodiment, the disk drive may be evaluated using jitter seeks having a number of different oscillation frequencies (e.g., that may excite different resonant frequencies of the VCM servo system). The oscillation frequency of the jitter seeks may be selected in any suitable manner, wherein in one embodiment the oscillation frequency is selected by selecting the amount of time the head remains on each target track after each seek. For example, FIG. 3B illustrates an increased oscillation frequency as compared to FIG. 3A by shortening the time interval that the head remains on each track. The head may perform a write or read operation the entire time the head remains over a track, or perform a write or read operation only part of the time. In addition, the control circuitry may begin the write or read operation immediately upon reaching the target track in order to evaluate settle performance, or delay the write or read operation to evaluate tracking performance.

Figure 3C:
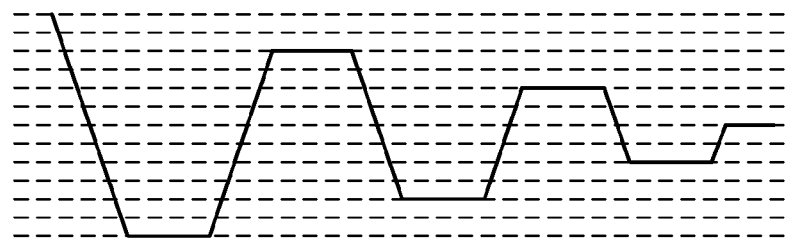
FIG. 3C illustrates an embodiment of the present invention wherein the seek distance is configured in order to select the frequency of the jitter seeks.
Figure 3D:
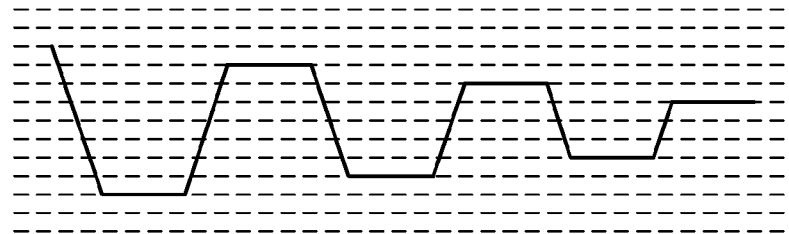
FIG. 3D illustrates an embodiment of the present invention wherein a shorter seek distance increases the frequency of the jitter seeks.

Any suitable seek distance may be selected for the jitter seeks, wherein FIG. 3C shows an example embodiment where the seek distance of the first seek operation spans twice as many tracks as compared to FIG. 3A. Any suitable number of seeks may also be executed, wherein FIG. 3C illustrates an embodiment where the number of seeks is double the number of seeks shown in FIG. 3A. FIG. 3D shows an embodiment wherein the oscillation frequency of the jitter seeks is adjusted (increased) by decreasing the seek distance of the jitter seeks as compared to FIG. 3C.

Figure 4A:
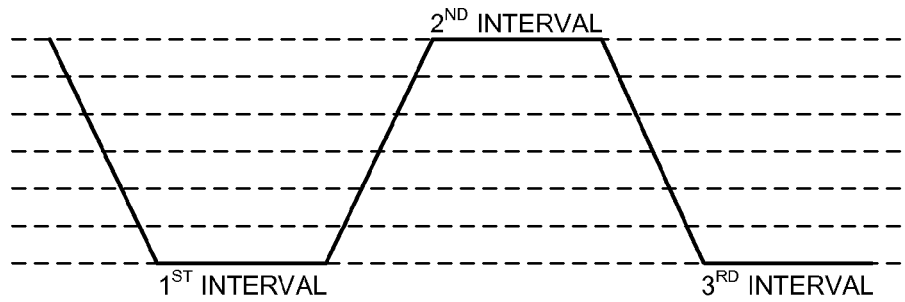
FIGS. 4A-4D illustrate embodiments of the present invention wherein an oscillation frequency of the jitter seeks is determined based on a seek distance and time interval that the head remains on each track without decreasing the seek distance during the jitter seeks.
Figure 5:
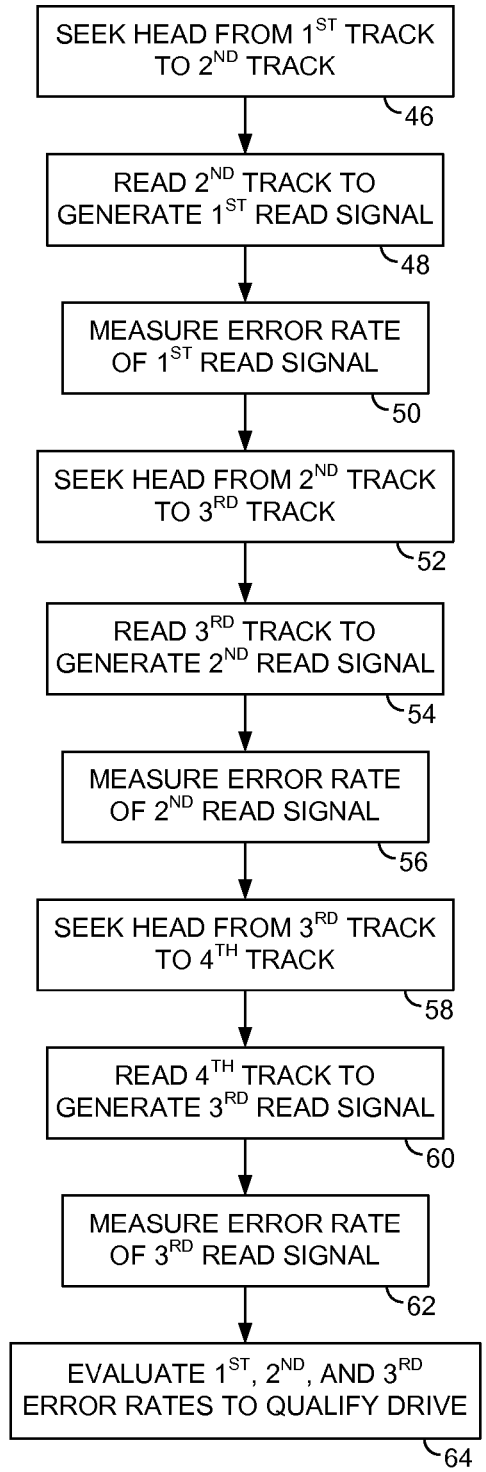
FIG. 5 is a flow diagram according to an embodiment of the present invention wherein the jitter seeks are performed without decreasing the seek distance.

FIG. 4A illustrates an embodiment of the present invention wherein the jitter seeks are preformed without decreasing the seek distance as shown in FIG. 3A. This embodiment is understood with reference to the flow diagram of FIG. 5, wherein the control circuitry first seeks the head a first seek distance from a first track to a second track (step 46), maintains the head over the second track for a first time interval and reads data from the second track during at least part of the first time interval to generate a first read signal (step 48), measures an error rate of the first read signal (step 50), second seeks the head a second seek distance from the second track to a third track (step 52), maintains the head over the third track for a second time interval and reads data from the third track for at least part of the second time interval to generate a second read signal (step 54), measures an error rate of the second read signal (step 56), third seeks the head a third seek distance from the third track to a fourth track (step 58), maintains the head over the fourth track for a third time interval and reads data from the fourth track for at least part of the third time interval to generate a third read signal (step 60), measures an error rate of the third read signal (step 62), and evaluates the first, second, and third read signals to qualify the disk drive (step 64), wherein the first, second, and third seeks and the first, second, and third intervals cause the actuator arm to oscillate at an oscillation frequency.

Figure 4B:
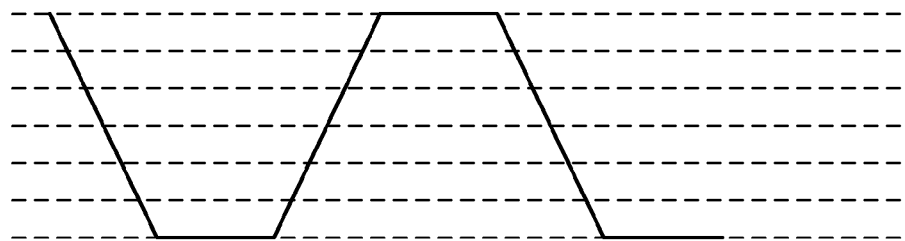
Figure 4C:
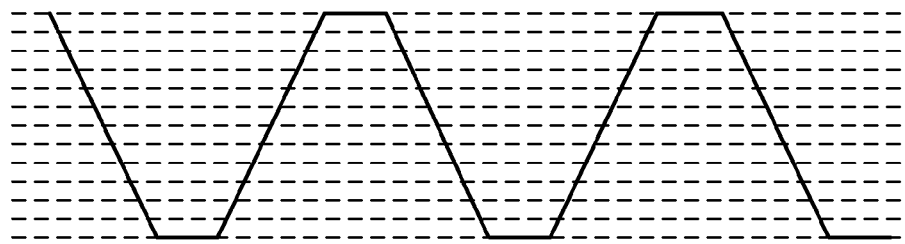
Figure 4D:
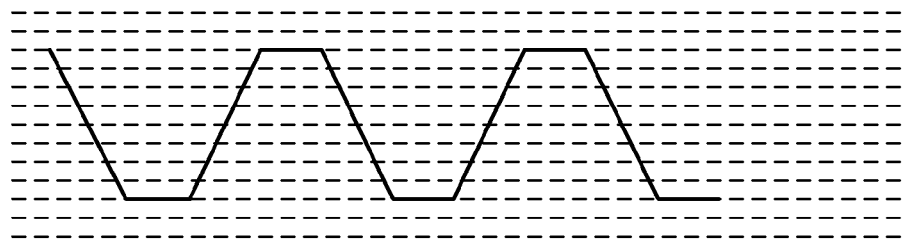

FIG. 4B illustrates an embodiment of the present invention wherein the oscillation frequency of the jitter seeks is increased compared to FIG. 4A by decreasing the time interval the head remains on each track. FIG. 4C shows an embodiment wherein the seek distance is twice that of FIG. 4A with an increased number of jitter seeks, and FIG. 4D shows an embodiment wherein the oscillation frequency of the jitter seeks is increased compared to FIG. 4C by decreasing the seek distance.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC. In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on.

In yet another embodiment, the control circuitry comprises suitable logic circuitry, such as state machine circuitry.

What is claimed is:

1. A disk drive comprising:
   a disk comprising a plurality of tracks;
   a head coupled to an actuator arm actuated over the disk; and
   control circuitry operable to:
   first seek the head a first seek distance from a first track to a second track;
   read data from the second track for a first time interval to generate a first read signal;
   second seek the head a second seek distance from the second track to a third track, wherein the second seek distance is less than the first seek distance;
   read data from the third track for a second time interval to generate a second read signal;
   third seek the head a third seek distance from the third track to a fourth track, wherein the third seek distance is less than the second seek distance;
   read data from the fourth track for a third time interval to generate a third read signal; and
   evaluate the first, second, and third read signals to qualify the disk drive,
   wherein the first, second, and third seeks are executed in proximity so as to excite the actuator arm with a jitter motion.

2. The disk drive as recited in claim 1, wherein the control circuitry is further operable to write the data before reading the data.

3. The disk drive as recited in claim 1, wherein the control circuitry is further operable to evaluate the first, second, and third read signals by measuring an error rate of the read signals.

4. The disk drive as recited in claim 1, wherein the first, second, and third time intervals determine the jitter motion.

5. The disk drive as recited in claim 1, wherein the jitter motion comprises a decaying oscillation.

6. A disk drive comprising:
   a disk comprising a plurality of tracks;
   a head coupled to an actuator arm actuated over the disk; and
   control circuitry operable to:
   first seek the head a first seek distance from a first track to a second track;
   maintain the head over the second track for a first time interval;
   read data from the second track during at least part of the first time interval to generate a first read signal;
   second seek the head a second seek distance from the second track to a third track;
   maintain the head over the third track for a second time interval;
   read data from the third track for at least part of the second time interval to generate a second read signal;
   third seek the head a third seek distance from the third track to a fourth track;
   maintain the head over the fourth track for a third time interval;
   read data from the fourth track for at least part of the third time interval to generate a third read signal; and
   evaluate the first, second, and third read signals to qualify the disk drive,
   wherein the first, second, and third seeks and the first, second, and third intervals cause the actuator arm to oscillate at an oscillation frequency.

7. The disk drive as recited in claim 6, wherein the control circuitry is further operable to write the data before reading the data.

8. The disk drive as recited in claim 6, wherein the control circuitry is further operable to evaluate the first, second, and third read signals by measuring an error rate of the read signals.

9. The disk drive as recited in claim 6, wherein the control circuitry is further operable to adjust at least one of the first, second, and third intervals in order to adjust the oscillation frequency.

10. The disk drive as recited in claim 6, wherein the first, second, and third seek distances are substantially equal.

11. The disk drive as recited in claim 6, wherein:
    the second seek distance is less than the first seek distance; and
    the third seek distance is less than the second seek distance.

12. The disk drive as recited in claim 6, wherein the control circuitry is further operable to adjust at least one of the first, second, and third seek distances in order to adjust the oscillation frequency.

13. A method of operating a disk drive, the disk drive comprising, a disk comprising a plurality of tracks, and a head coupled to an actuator arm actuated over the disk, the method comprising:
    first seeking the head a first seek distance from a first track to a second track;
    reading data from the second track for a first time interval to generate a first read signal;
    second seeking the head a second seek distance from the second track to a third track, wherein the second seek distance is less than the first seek distance;
    reading data from the third track for a second time interval to generate a second read signal;
    third seeking the head a third seek distance from the third track to a fourth track, wherein the third seek distance is less than the second seek distance;
    reading data from the fourth track for a third time interval to generate a third read signal; and
    evaluating the first, second, and third read signals to qualify the disk drive, wherein the first, second, and third seeks are executed in proximity so as to excite the actuator arm with a jitter motion.

14. The method as recited in claim 13, further comprising writing the data before reading the data.

15. The method as recited in claim 13, further comprising evaluating the first, second, and third read signals by measuring an error rate of the read signals.

16. The method as recited in claim 13, wherein the first, second, and third time intervals determine the jitter motion.

17. The method as recited in claim 13, wherein the jitter motion comprises a decaying oscillation.

18. A method of operating a disk drive, the disk drive comprising, a disk comprising a plurality of tracks, and a head coupled to an actuator arm actuated over the disk, the method comprising:
    first seeking the head a first seek distance from a first track to a second track;
    maintaining the head over the second track for a first time interval;
    reading data from the second track during at least part of the first time interval to generate a first read signal;
    second seeking the head a second seek distance from the second track to a third track;

maintaining the head over the third track for a second time interval;

reading data from the third track for at least part of the second time interval to generate a second read signal;

third seeking the head a third seek distance from the third track to a fourth track;

maintaining the head over the fourth track for a third time interval;

reading data from the fourth track for at least part of the third time interval to generate a third read signal; and evaluating the first, second, and third read signals to qualify the disk drive, wherein the first, second, and third seeks and the first, second, and third intervals cause the actuator arm to oscillate at an oscillation frequency.

19. The method as recited in claim 18, further comprising writing the data before reading the data.

20. The method as recited in claim 18, further comprising evaluating the first, second, and third read signals by measuring an error rate of the read signals.

21. The method as recited in claim 18, further comprising adjusting at least one of the first, second, and third intervals in order to adjust the oscillation frequency.

22. The method as recited in claim 18, wherein the first, second, and third seek distances are substantially equal.

23. The method as recited in claim 18, wherein:
the second seek distance is less than the first seek distance; and
the third seek distance is less than the second seek distance.

24. The method as recited in claim 18, further comprising adjusting at least one of the first, second, and third seek distances in order to adjust the oscillation frequency.

* * * * *